US012719638B2

(12) United States Patent
Xiong et al.

(10) Patent No.: US 12,719,638 B2
(45) Date of Patent: Aug. 25, 2026

(54) UE DETERMINATION OF MICS INDEX BASED ON PUSCH SCHEDULING IN 5G NR

(71) Applicant: Intel Corporation, Santa Clara, CA (US)

(72) Inventors: Gang Xiong, Beaverton, OR (US); Yingyang Li, Beijing (CN); Yi Wang, Beijing (CN)

(73) Assignee: Intel Corporation, Santa Clara, CA (US)

(*) Notice: Subject to any disclaimer, the term of this patent is extended or adjusted under 35 U.S.C. 154(b) by 237 days.

(21) Appl. No.: 18/287,707

(22) PCT Filed: Nov. 1, 2022

(86) PCT No.: PCT/US2022/048610

§ 371 (c)(1),
(2) Date: Oct. 20, 2023

(87) PCT Pub. No.: WO2023/081161

PCT Pub. Date: May 11, 2023

(65) Prior Publication Data

US 2024/0187190 A1 Jun. 6, 2024

Related U.S. Application Data

(60) Provisional application No. 63/312,713, filed on Feb. 22, 2022, provisional application No. 63/296,403, (Continued)

(51) Int. Cl.
*H04L 5/00* (2006.01)
*H04L 1/1822* (2023.01)
*H04W 72/232* (2023.01)

(52) U.S. Cl.
CPC .......... *H04L 5/0053* (2013.01); *H04L 1/1822* (2013.01); *H04W 72/232* (2023.01)

(58) Field of Classification Search
CPC ..... H04L 5/00; H04L 1/18; H04L 1/08; H04L 1/00; H04L 1/06; H04L 5/16;
(Continued)

(56) References Cited

U.S. PATENT DOCUMENTS 11,039,477 B2 * 6/2021 Charbit ................. H04L 1/0003
11,382,127 B2 * 7/2022 Khoshnevisan .. H04W 72/0446
(Continued)

FOREIGN PATENT DOCUMENTS

WO WO-2022203331 A1 9/2022
WO WO-2023081161 A1 5/2023

OTHER PUBLICATIONS

"International Application Serial No. PCT/US2022/048610, International Search Report mailed Mar. 8, 2023", 4 pgs.
(Continued)

*Primary Examiner* — Man U Phan
(74) *Attorney, Agent, or Firm* — Schwegman Lundberg & Woessner, P.A.

(57) ABSTRACT

A UE configured for operation in a 5GNR system may decode a first DCI scheduling a first PUSCH transmission with transport-block processing over multiple slots (TBoMS) and a second DCI scheduling a second PUSCH transmission with TBoMS. The UE may check timing relations of the scheduled first and second PUSCH transmissions with TBoMS for validity. When the timing relations are valid, the UE may transmit the first PUSCH transmission in multiple slots in accordance with the first DCI and may transmit the second PUSCH transmission in multiple slots in accordance with the second DCI. The first DCI may be received in a first PDCCH and the second DCI may be received in a second PDCCH. When the first PDCCH ends at a first symbol and the UE is scheduled to start the first PUSCH transmission with TBoMS at a second
(Continued)

symbol, the second PUSCH transmission with TBoMS is not expected to be scheduled to start earlier than an end of the first PUSCH transmission with TBoMS when the second PDCCH that scheduled the second PUSCH transmission with TBoMS ends at a symbol later than the first symbol.

17 Claims, 8 Drawing Sheets

Related U.S. Application Data filed on Jan. 4, 2022, provisional application No. 63/275,826, filed on Nov. 4, 2021.

(58) Field of Classification Search
CPC ...... H04L 27/26; H04W 72/23; H04W 72/12; H04W 72/04; H04W 72/14; H04W 72/21; H04W 52/14; H04W 52/24; H04W 52/32; H04W 52/58; H04W 52/02; H04W 74/08; H04W 74/00; H04W 76/27
USPC .......................................................... 370/329
See application file for complete search history.

(56) References Cited

U.S. PATENT DOCUMENTS 11,395,182 B2 * 7/2022 Liu ....................... H04W 72/21
11,483,856 B2 * 10/2022 You ........................... H04L 1/08
11,843,935 B2 * 12/2023 You ....................... H04L 5/0094
12,200,685 B2 * 1/2025 Yao ....................... H04L 1/1893
12,284,646 B2 * 4/2025 Yi ..................... H04W 72/1268
2020/0351934 A1 11/2020 Khoshnevisan et al.
2021/0251016 A1 8/2021 Xiong et al.
2023/0124808 A1 * 4/2023 Sridharan ................. H04L 1/08 370/329
2024/0283612 A1 * 8/2024 Cozzo ................... H04L 5/0053
2024/0323964 A1 * 9/2024 Yi ......................... H04L 5/0051
2024/0381364 A1 * 11/2024 Su ............................ H04L 1/08
2024/0422784 A1 * 12/2024 Liu ......................... H04L 1/189
2025/0071816 A1 * 2/2025 Oh ............................ H04L 1/08

OTHER PUBLICATIONS

"International Application Serial No. PCT/US2022/048610, Written Opinion mailed Mar. 8, 2023", 6 pgs.
Apple Inc, "PUCCH coverage enhancements", R1-2110049, 3GPP TSG RAN WG1, (Oct. 2, 2021), 4 pgs.
Intel Corporation, "Further analysis and details of intra-UE multiplexing and rrioritization", R1-2103030, 3GPP TSG RAN WG1 Meeting, (Apr. 7, 2021), 21 pgs.
Nokia, et al., "Transport block processing for PUSCH coverage enhancements", R1-2109887, 3GPP TSG RAN WG1, (Oct. 1, 2021), 19 pgs.
Nokia, et al., "Transport block processing for PUSCH coverage enhancements", R1-2106656, 3GPP TSG RAN WG1, (Aug. 6, 2021), 10 pgs.
"International Application Serial No. PCT US2022 048610, International Preliminary Report on Patentability mailed May 16, 2024", 8 pgs.
"Japanese Application Serial No. 2023-576033, Voluntary Amendment Filed Sep. 5, 2024", w English Claims, 19 pgs.
"Japanese Application Serial No. 2023-576033, Notification of Reasons for Refusal mailed Jun. 24, 2025", W English Translation, 16 pgs.
"3rd Generation Partnership Project Technical Specification Group Radio Access Network NR Physical layer procedures for data Release 17", 3GPP TS 38.214 V17.3.0, [Online]. Retrieved from the Internet URL https www.3gpp.org ftp Specs archive 38_series 38.214 38214-h30.zip, Sep. 21, 2022, 300 pgs.
"Japanese Application Serial No. 2023-576033, Response filed Sep. 22, 2025 to Notification of Reasons for Refusal mailed Jun. 24, 2025", W English Claims, 13 pgs.
"European Application Serial No. 22890687.1, Extended European Search Report mailed Nov. 6, 2025", 14 pgs.
"Japanese Application Serial No. 2023-576033, Final Notification of Reasons for Refusal mailed Oct. 14, 2025", W/English Translation, 14 pgs.
"Japanese Application Serial No. 2023-576033, Response filed Jan. 9, 2026 to Final Notification of Reasons for Refusal mailed Oct. 14, 2025", W/English Claims, 10 pgs.
Nokia, "Approaches and solutions for Type A PUSC H repetitions for Msg3", 3GPP TSG RAN WG1 #107-e R1-2110867, Nokia Shanghai Bell, (Nov. 5, 2021), 15 pgs.
Sharp, "TB processing over multi-slot PUSCH", 3GPP Draft; R1-2101546, 3rd Generation Partnership Project (3GPP), Mobile Competence Centre ; 650, Route Des Lucioles ; F-06921 Sophia-Antipolis Cedex; France, vol. RAN WG1, No. e-Meeting, [Online] Retrieved from the internet: <https ://ftp.3gpp.org/tsg_ran/WGI_RLI/TSGRI_104-e/Docs/RI-2101546.zip>, (Jan. 19, 2021), 2 pgs.
Vivo, "Discussion on solutions for PUSCH coverage enhancement", 3GPP TSG RAN WG1 #103-e, 3GPP Draft; R1-2007680, 3rd Generation Partnership Project (3GPP), Mobile Competence Centre ; 650, Route Des Lucioles ; F-06921 Sophia-Antipolis Cedex ; France, (Nov. 1, 2020), 9 pgs.
"Japanese Application Serial No. 2023-576033, Notification of Reasons for Refusal mailed Apr. 14, 2026", w English Translation, 4 pgs.
"European Application Serial No. 22890687.1, Response filed May 22, 2026 to Extended European Search Report mailed Nov. 6, 2025", 21 pgs.

* cited by examiner

UE DETERMINATION OF MICS INDEX BASED ON PUSCH SCHEDULING IN 5G NR

PRIORITY CLAIM

This application is a U.S. National Stage Filing under 35 U.S.C. 371 from International Application No. PCT/US2022/048610, filed Nov. 1, 2022 and published in English as WO 2023/081161 on May 11, 2023, which claims the benefit of priority to U.S. Provisional Patent Application Ser. No. 63/275,826, filed Nov. 4, 2021 [reference number AE0120-Z], U.S. Provisional Patent Application Ser. No. 63/296,403, filed Jan. 4, 2022, and U.S. Provisional Patent Application Ser. No. 63/312,713, filed Feb. 22, 2022, each of which is incorporated herein by reference in its entirety.

TECHNICAL FIELD

Embodiments pertain to wireless communications. Some embodiments relate to wireless networks including 3GPP (Third Generation Partnership Project) and fifth-generation (5G) networks including 5G new radio (NR) (or 5G-NR) networks. Some embodiments relate to sixth-generation (6G) networks.

BACKGROUND

One issue with communicating data over a wireless network is* Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich contents and services.

For cellular system, coverage is an important factor for successful operation. Compared to LTE, NR can be deployed at relatively higher carrier frequency in frequency range 1 (FR1), e.g., at 3.5 GHz. In this case, coverage loss is expected due to larger path-loss, which makes it more challenging to maintain an adequate quality of service. Typically, uplink coverage is the bottleneck for system operation considering the low transmit power at UE side.

In NR, a transport block (TB) carried by a physical uplink shared channel (PUSCH) is scheduled within a slot or resource allocation of one data transmission is confined with a slot. In this case, transport block size (TBS) is determined based on the number of resource elements (RE) in a slot. To maintain a low code rate, a transport block may span more than one slot where a smaller number of physical resource blocks (PRBs) may be allocated in frequency so as to improve link budget for the PUSCH transmission. In this case, TBS may based on the number of allocated slots for TB processing over multiple slots (TBoMS). One issue with TBoMS is out-of-order (OOO) handling. Thus there are general needs for systems and methods that address out-of-order (OOO) handling related to TBoMS.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments disclosed herein relate to transport-block processing over multiple slots (TBoMS). Some embodiments related to out-of-order handling for TBoMS. Some embodiments relate to physical uplink control channel (PUCCH) repetition with demodulation reference signal (DMRS) bundling. Some embodiments related to physical uplink shared channel (PUSCH) repetition with DMRS bunding. These embodiments as wells as others are described in more detail below.

In some embodiments, a user equipment (UE) configured for operation in a fifth-generation new radio (5G NR) system may decode a first downlink control information (DCI) and a second DCI received from a gNodeB (gNB). The first DCI may schedule a first physical uplink shared channel (PUSCH) transmission with transport-block processing over multiple slots (TBoMS) and the second DCI may schedule a second PUSCH transmission with TBoMS. The UE may check timing relations of the scheduled first and second PUSCH transmissions with TBoMS for validity. When the timing relations are valid, the UE may transmit the first PUSCH transmission in multiple slots in accordance with the first DCI and may transmit the second PUSCH transmission in multiple slots in accordance with the second DCI. The first DCI may be received in a first physical downlink control channel (PDCCH) and the second DCI may be received in a second PDCCH. When the first PDCCH ends at a first symbol and the UE is scheduled to start the first PUSCH transmission with TBoMS at a second symbol, the second PUSCH transmission with TBoMS is not expected to be scheduled to start earlier than an end of the first PUSCH transmission with TBoMS when the second PDCCH that scheduled the second PUSCH transmission with TBoMS ends at a symbol later than the first symbol. These embodiments as wells as others are described in more detail below.

Figure 1A:
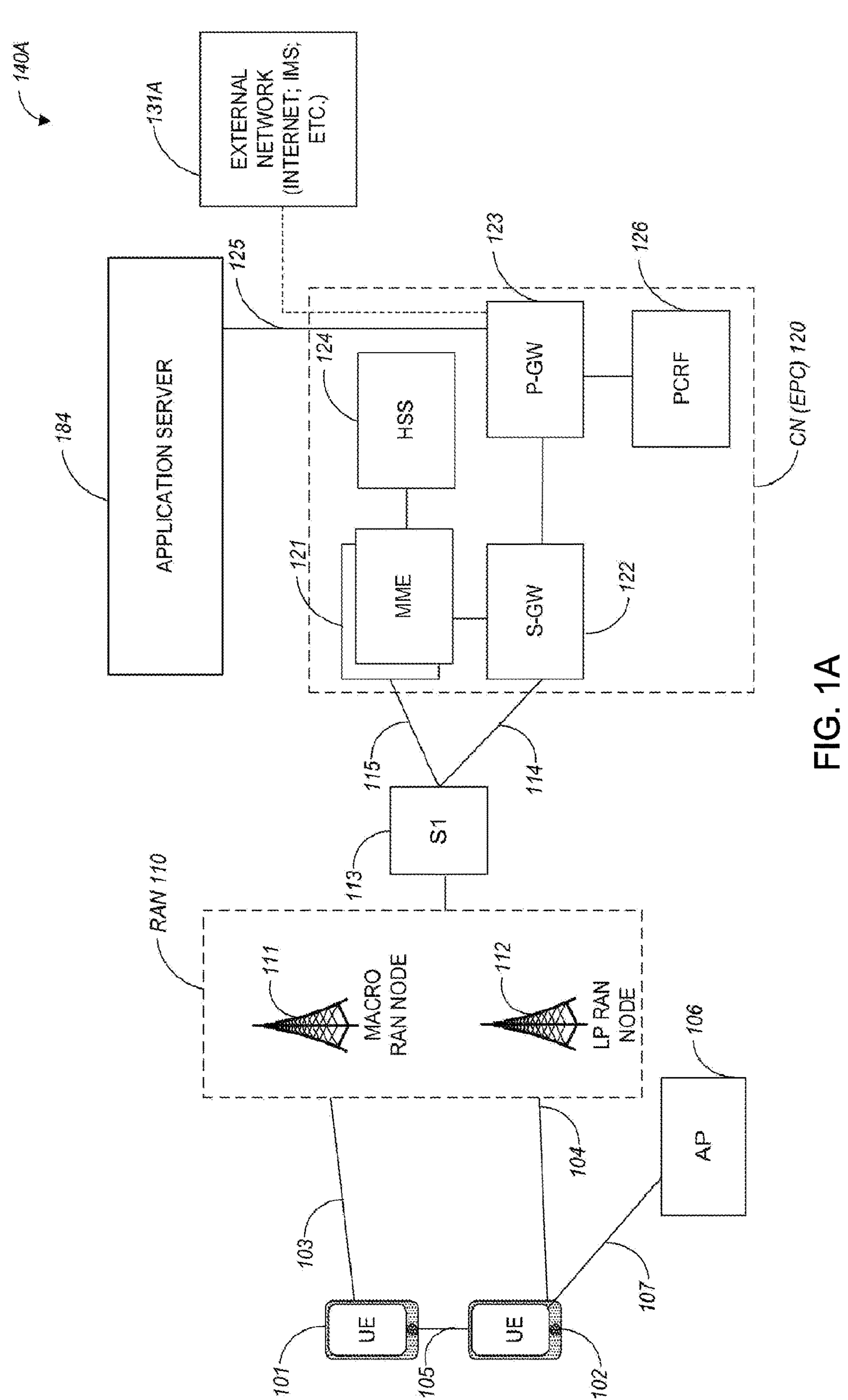
FIG. 1A illustrates an architecture of a network, in accordance with some embodiments.

FIG. 1A illustrates an architecture of a network in accordance with some embodiments. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some embodiments, carrier aggregation may be used where one or more component carriers operate on unlicensed frequencies.

Embodiments described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Embodiments described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some embodiments, any of the UEs 101 and 102 can comprise an Internet-of-Things (IoT) UE or a Cellular IoT (CIoT) UE, which can comprise a network access layer designed for low-power IoT applications utilizing short-lived ULE connections. In some embodiments, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some embodiments, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some embodiments, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro-RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility embodiments in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some embodiments, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some embodiments, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some embodiments, the gNBs and the NG-eNBs can be connected to the AMF by NG-C interfaces, and to the UPF by NG-U interfaces. The gNBs and the NG-eNBs can be coupled to each other via Xn interfaces.

In some embodiments, the NG system architecture can use reference points between various nodes as provided by 3GPP Technical Specification (TS) 23.501 (e.g., V15.4.0, 2018-12). In some embodiments, each of the gNBs and the NG-eNBs can be implemented as a base station, a mobile edge server, a small cell, a home eNB, and so forth. In some embodiments, a gNB can be a master node (MN) and NG-eNB can be a secondary node (SN) in a 5G architecture.

Figure 1B:
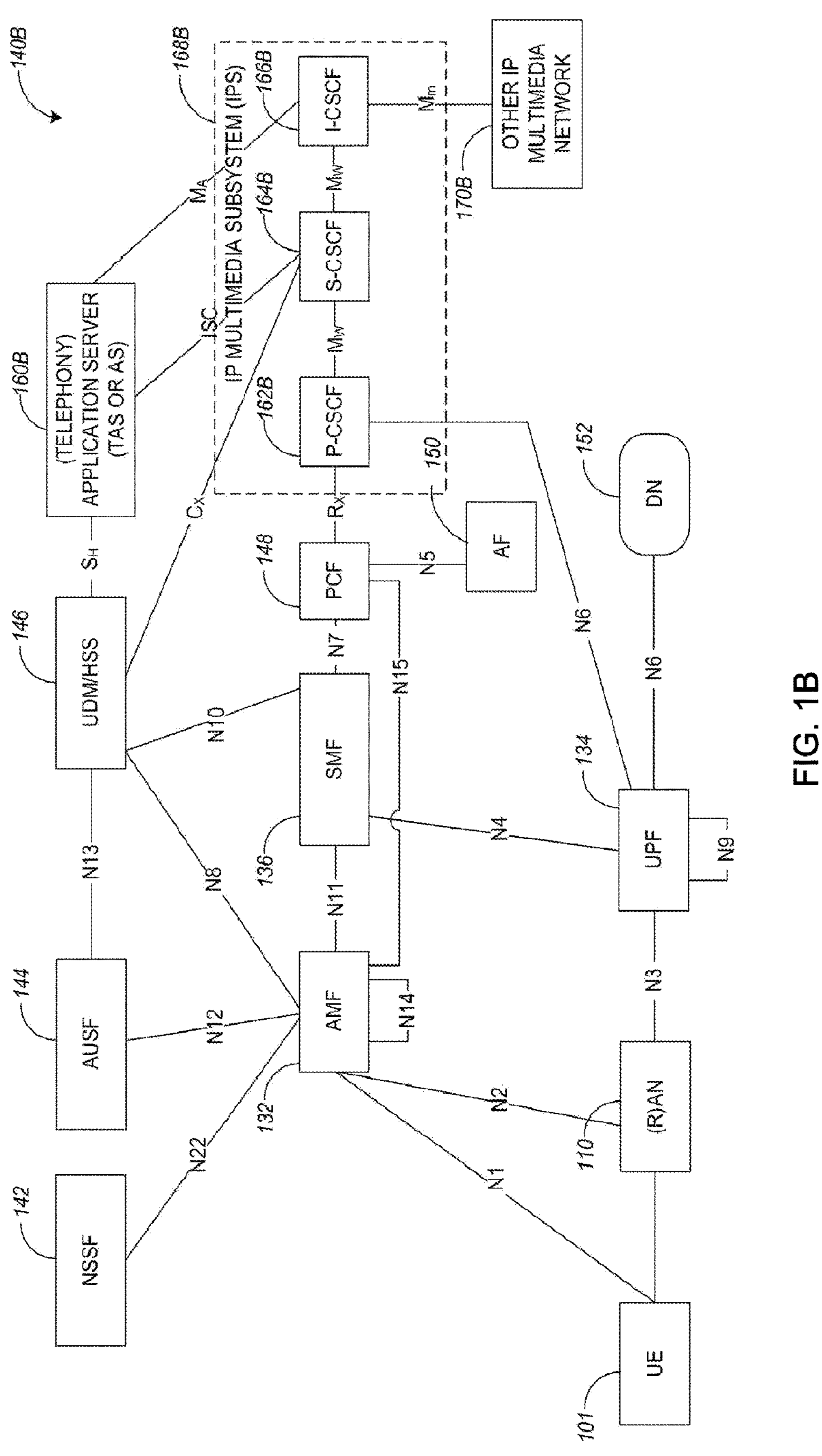
FIG. 1B and FIG. 1C illustrate a non-roaming 5G system architecture in accordance with some embodiments.

FIG. 1B illustrates a non-roaming 5G system architecture in accordance with some embodiments. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some embodiments, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain embodiments of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some embodiments, the I-CSCF 166B can be connected to another IP multimedia network 170E, e.g. an IMS operated by a different network operator.

In some embodiments, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
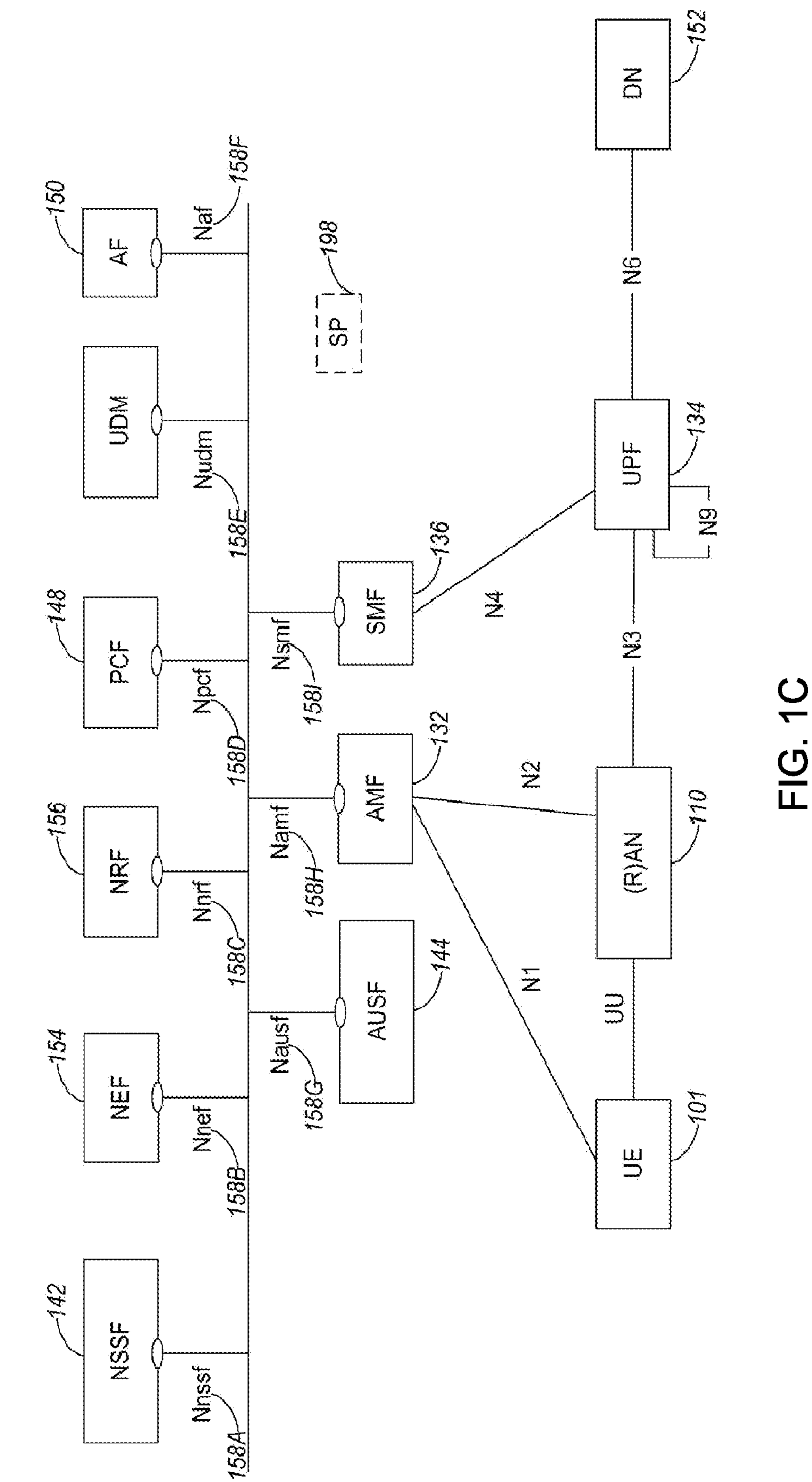

FIG. 1C illustrates a 5G system architecture 140C and a service-based representation. In addition to the network entities illustrated in FIG. 1, system architecture 140C can also include a network exposure function (NEF) 154 and a network repository function (NRF) 156. In some embodiments, 5G system architectures can be service-based and interaction between network functions can be represented by corresponding point-to-point reference points Ni or as service-based interfaces.

In some embodiments, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 1581 (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5*g*-eir, and Nudsf) not shown in FIG. 1C can also be used.

In some embodiments, any of the UEs or base stations described in connection with FIGS. 1A-1C can be configured to perform the functionalities described herein.

Rel-15 NR systems are designed to operate on the licensed spectrum. The NR-unlicensed (NR-U), a short-hand notation of the NR-based access to unlicensed spectrum, is a technology that enables the operation of NR systems on the unlicensed spectrum.

In NR, a transport block (TB) carried by a PUSCH is scheduled within a slot or resource allocation of one data transmission is confined with a slot. In this case, transport block size (TBS) is determined based on the number of resource elements (RE) in a slot. To maintain a low code rate, a transport block may span more than one slot where a smaller number of physical resource blocks (PRBs) may be allocated in frequency so as to improve link budget for PUSCH transmission. In this case, transport block size (TBS) is determined based on the number of allocated slots for the TB processing over multiple slots (TBoMS). Following the same design principle for single-slot PUSCH repetition type A, same time domain resource allocation is allocated for each slot for TBoMS transmission.

Figures 2A, 2B:
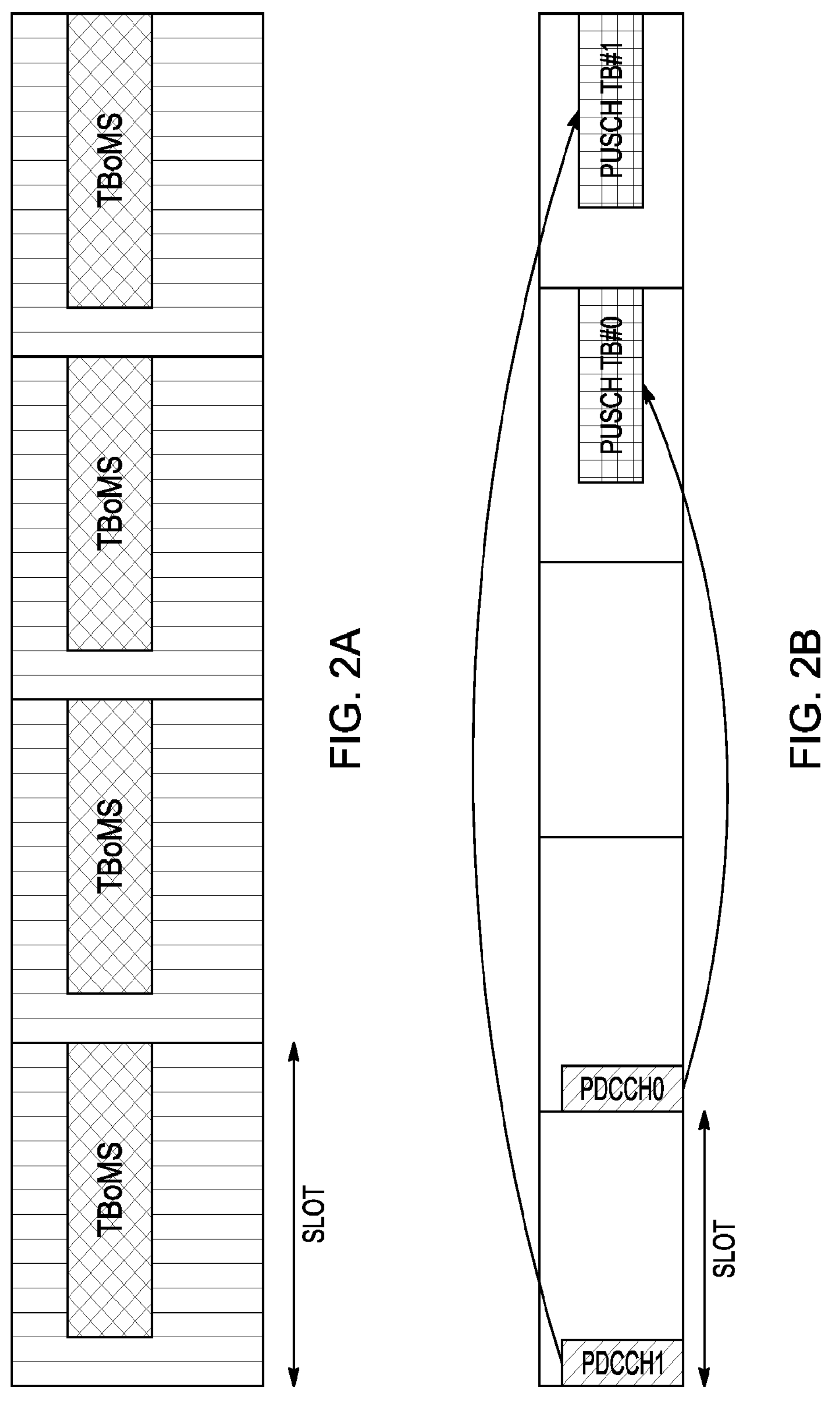
FIG. 2A illustrates PUSCH with TB processing over multiple slots (TBoMS), in accordance with some embodiments.
FIG. 2B illustrates OOO for single-slot PUSCH scheduling, in accordance with some embodiments.

FIG. 2A illustrates one example of PUSCH with TB processing over multiple slots. In the example, 4 slots are allocated for TBoMS transmission, where same time domain resource allocation is allocated for each slot for TBoMS transmission.

In NR, out-of-order (OOO) between the PDCCHs and the scheduled PDSCHs/PUSCHs are considered invalid. More specifically, for any two HARQ process IDs in a given scheduled cell, if the UE is scheduled to start a first PUSCH transmission starting in symbol j by a PDCCH ending in symbol i, the UE is not expected to be scheduled to transmit a PUSCH starting earlier than the end of the first PUSCH by a PDCCH that ends later than symbol i.

FIG. 2B illustrates one example of OOO for single-slot PUSCH scheduling. In particular, this is considered as OOO due to that PDSCH #0 is after PDSCH #1 while the scheduled PUSCH #0 is before PUSCH #1.

Given that TBoMS spans more than one slots, and it is counted based on available slots, certain mechanism may need to be defined for the OOO handling between two TBoMS transmissions, and between TBoMS and single-slot PUSCH transmission. Embodiments disclosed herein describe mechanisms for out of order handling for scheduling PUSCH with TB processing over multiple slots. In particular, embodiments are directed to Out of order handling between two TBoMS transmissions, OOO handling between TBoMS and single-slot PUSCH transmission, and OOO handling for PUSCH repetition type A with counting based on available slot and TBoMS.

Out of Order Handling Between Two TBoMS Transmissions

As mentioned above, in NR, out-of-order (OOO) between the PDCCHs and the scheduled PDSCHs/PUSCHs are considered invalid. More specifically, for any two HARQ process IDs in a given scheduled cell, if the UE is scheduled to start a first PUSCH transmission starting in symbol j by a PDCCH ending in symbol i, the UE is not expected to be scheduled to transmit a PUSCH starting earlier than the end of the first PUSCH by a PDCCH that ends later than symbol i. Given that TBoMS spans more than one slots, and it is counted based on available slots, certain mechanism may need to be defined for the OOO handling between two TBoMS transmissions, and between TBoMS and single-slot PUSCH transmission.

Embodiments of mechanisms on out of order handling between two TBoMS transmissions are provided as follows:

In one embodiment, for any two HARQ process IDs in a given scheduled cell, if the UE is scheduled to start a first TBoMS transmission starting in symbol j by a PDCCH ending in symbol i, the UE is not expected to be scheduled to transmit a TBoMS starting earlier than the end of the first TBoMS by a PDCCH that ends later than symbol i.

Figure 3:
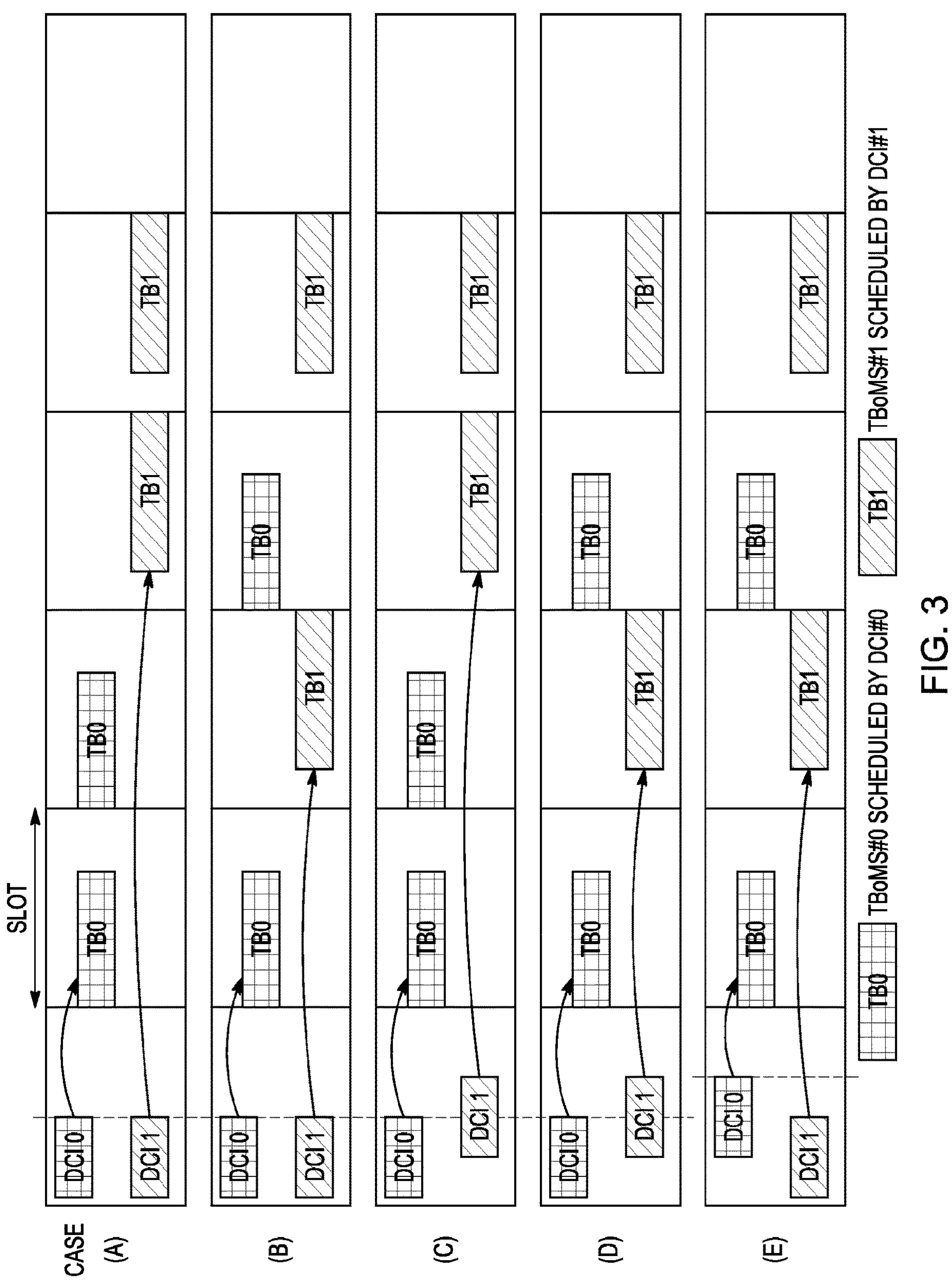
FIG. 3 illustrates OOO handling between two TBoMS transmissions, in accordance with some embodiments.

FIG. 3 illustrates examples of OOO handling between two TBoMS transmissions. In the examples, based on the above option, cases D and E illustrate invalid scheduling for TBoMS transmission, while cases A, B and C illustrate valid scheduling. Note that valid scheduling indicates that there is no OOO issue for TBoMS and invalid scheduling indicates there is OOO issue.

In another embodiment, for any two HARQ process IDs in a given scheduled cell, if the UE is scheduled to start a first TBoMS transmission starting in symbol j by a PDCCH ending in symbol i, the UE is not expected to be scheduled to transmit a TBoMS starting earlier than the end of the first TBoMS by a PDCCH that ends not earlier than symbol i. Based on this option, in the examples as shown in FIG. 3, cases B, D, E illustrate invalid scheduling for TBoMS transmission, while cases A and C illustrate valid scheduling.

In another embodiment, for any two HARQ process IDs in a given scheduled cell, if the UE is scheduled to start a first TBoMS transmission starting in symbol j and ending in symbol i by a first PDCCH, the UE is not expected to be scheduled to transmit a second TBoMS starting earlier than the end of the first TBoMS and later than the start of the first TBoMS by a second PDCCH. Note that this option indicates that UE is not expected to transmit a first TBoMS between the time duration of a second TBoMS. The above option can also apply for configured grant based TBoMS. In particular, if the UE is scheduled or configured to start a first TBoMS transmission, the UE is not expected to be scheduled to transmit a second TBoMS starting earlier than the end of the first TBoMS and later than the start of the first TBoMS. Based on this option, in the examples as shown in FIG. 3, cases B, D, E illustrate invalid scheduling for TBoMS transmission, while cases A and C illustrate valid scheduling.

Out of Order Handling Between TBoMS and Single-Slot PUSCH Transmission

Embodiments of mechanisms on out of order handling between two TBoMS and single-slot PUSCH transmission are provided as follows:

In one embodiment, for any two HARQ process IDs in a given scheduled cell, if the UE is scheduled to start a first TBoMS transmission starting in symbol j by a PDCCH ending in symbol i, the UE is not expected to be scheduled to transmit a PUSCH starting earlier than the end of the first TBoMS by a PDCCH that ends later than symbol i.

Figure 4:
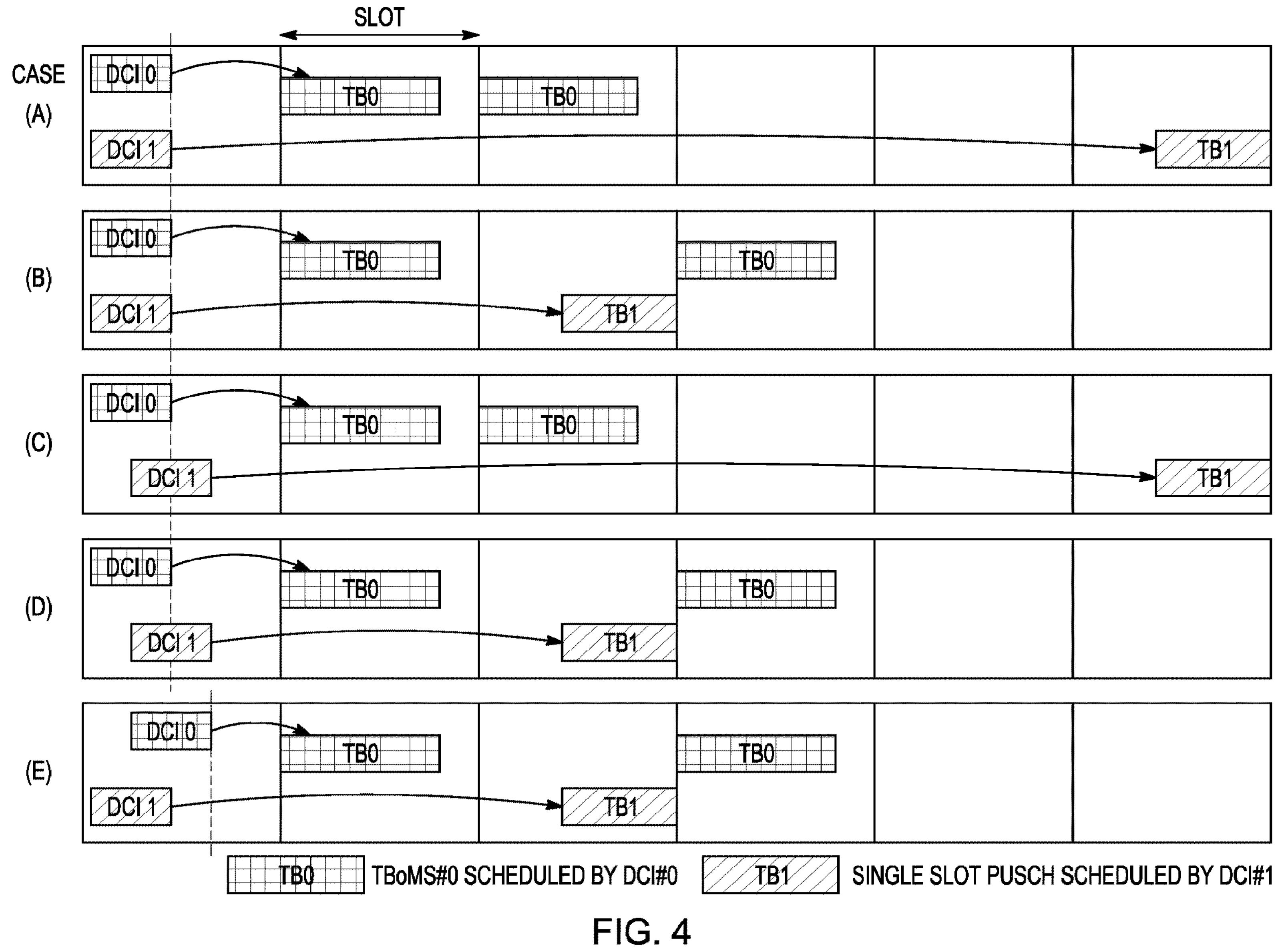
FIG. 4 illustrate OOO handling between TBoMS and single-slot PUSCH transmission, in accordance with some embodiments.

FIG. 4 illustrates examples of OOO handling between TBoMS and single-slot PUSCH transmission. In the examples, based on the above option, cases D and E illustrate invalid scheduling for TBoMS transmission, while cases A, B and C illustrate valid scheduling.

In another embodiment, for any two HARQ process IDs in a given scheduled cell, if the UE is scheduled to start a first TBoMS transmission starting in symbol j by a PDCCH ending in symbol i, the UE is not expected to be scheduled to transmit a PUSCH starting earlier than the end of the first TBoMS by a PDCCH that ends not earlier than symbol i. Based on this option, in the examples as shown in FIG. 4, cases B, D, E illustrate invalid scheduling for TBoMS transmission, while cases A and C illustrate valid scheduling.

In another embodiment, for any two HARQ process IDs in a given scheduled cell, if the UE is scheduled to start a first TBoMS transmission starting in symbol j and ending in symbol i by a first PDCCH, the UE is not expected to be scheduled to transmit a single slot PUSCH starting earlier than the end of the first TBoMS and later than the start of the first TBoMS by a second PDCCH. Note that this option indicates that UE is not expected to transmit a PUSCH between the time duration of a TBoMS. The above option can also apply for configured grant based TBoMS. In particular, if the UE is scheduled or configured to start a first TBoMS transmission, the UE is not expected to be scheduled to transmit a single-slot PUSCH starting earlier than the end of the first TBoMS and later than the start of the first TBoMS. Based on this option, in the examples as shown in FIG. 4, cases B, D, E illustrate invalid scheduling for TBoMS transmission, while cases A and C illustrate valid scheduling.

Note that the above embodiments can also apply for the case when PUSCH repetition type A with counting based on available slots, i.e., OOO handling between PUSCH repetition type A with counting based on available slots and TBoMS, between PUSCH repetition type A with counting based on available slots and single slot PUSCH transmission.

DMRS Bundling for Time Domain Window

Embodiments for demodulation reference signal (DMRS) bundling for time domain window are provided as follows:

In one embodiment, dropping or cancellation of a PUSCH and PUCCH repetition based on Rel-15/16 is regarded as an event that violates power consistency and phase continuity. In this case, when PUCCH repetition with low priority is dropped when overlapping with PUSCH transmission with high priority, this should be treated as an event that violates power consistency and phase continuity.

Events which cause power consistency and phase continuity not to be maintained across PUSCH transmissions of PUSCH repetition type A scheduled by DCI format 0_1 or 0_2, or PUSCH repetition Type A with a configured grant, or PUSCH repetition type B or TB processing over multiple slots, or PUCCH transmissions of PUCCH repetition, within the nominal TDW, are:

- A downlink slot or downlink reception or downlink monitoring based on tdd-UL-DL-ConfigurationCommon and tdd-UL-DL-ConfigurationDedicated for unpaired spectrum.
- The gap between any two consecutive PUSCH transmissions, or the gap between any two consecutive PUCCH transmissions, exceeds 13 symbols.
- The gap between any two consecutive PUSCH transmissions, or the gap between any two consecutive PUCCH transmissions, does not exceed 13 symbols but other uplink transmissions are scheduled between the two consecutive PUSCH transmissions or the two consecutive PUCCH transmissions.
- For PUSCH transmissions of PUSCH repetition type A, or PUSCH repetition type B or TB processing over multiple slots, a dropping or cancellation of a PUSCH transmission.
- For PUCCH transmissions of PUCCH repetition, a dropping or cancellation of a PUCCH transmission.
- For any two consecutive PUSCH transmissions of PUSCH repetition type A, or PUSCH repetition type B, and when two SRS resource sets are configured in srs-ResourceSetToAddModList or srs-ResourceSet-ToAddModListDCI-0-2 with higher layer parameter usage in SRS-ResourceSet set to 'codebook' or 'non-codebook', a different SRS resource set association is used for the two PUSCH transmissions of PUSCH repetition type A, or PUSCH repetition type B.
- For any two consecutive PUCCH transmissions of PUCCH repetition, and when a PUCCH resource used for repetitions of a PUCCH transmission by a UE includes first and second spatial relations, different spatial relations are used for the two PUCCH transmissions of PUCCH repetition.

Uplink timing adjustment in response to a timing advance command.

Frequency hopping.

MCS Indication for Msg3 Retransmission

Embodiments for Modulation and coding scheme (MCS) indication for Msg3 retransmission are provided as follows:

In one embodiment, as 5-bit MCS is included in the downlink control information (DCI) format 0_0 with Cyclic Redundancy Check (CRC) scrambled by the Temporary Cell-Radio Network Temporary Identifier (TC-RNTI) and 2 bits are used for repetition factor indication, 3 bits can be applied for MCS indication. In this case, first 4 MCS indexes can be reused from these configured for Msg3 initial transmission, where 4 additional MCS indexes are configured for Msg3 retransmission. In case when the configuration is absent, MCS index of 0~7 is applied.

OOO Handling for PUSCH Repetition Type a with Counting Based on Available Slot and TBoMS Embodiments of the OOO handling for PUSCH repetition type A with counting based on available slot and TBoMS are provided as follows:

In one embodiment, for PUSCH repetition type A with counting based on available slot and TBoMS, the OOO handling is determined in accordance with the first PUSCH repetition or the first slot used for TBoMS transmission which is indicated by scheduling offset K2, regardless of whether the slot indicated by K2 is an available slot. This may also apply for the case when a single PUSCH transmission with counting based on available slots, i.e., K=1 for PUSCH repetition type A or N=1 and K=1 for TBoMS. This also applies for the case when K>1 for PUSCH repetition type A or N=1 and K>1 for TBoMS or N>1 and K>1 for TBoMS. Similarly, this may also apply for the case for OOO handling between PUSCH repetition type A and single slot PUSCH transmission, as well as between TBoMS and single-slot PUSCH transmission.

Figure 5:
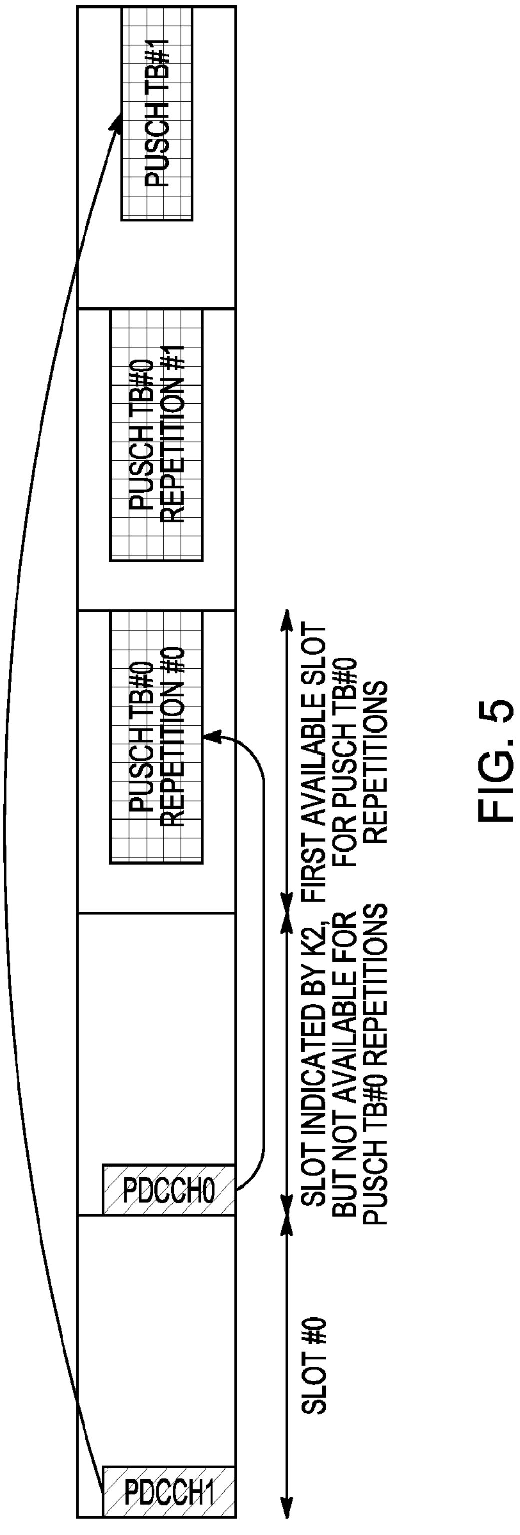
FIG. 5 illustrates OOO handling for PUSCH repetition type A, in accordance with some embodiments.

FIG. 5 illustrates one example of OOO handling for PUSCH repetition type A. In the example, slot #2 is the slot indicated by K2 for the first PUSCH repetition for TB #0.Based on this option, symbol in the slot #2 is used to determine whether OOO is applied between PUSCH repetition and single slot PUSCH.

In another embodiment, for PUSCH repetition type A with counting based on available slot and TBoMS, the OOO handling is determined in accordance with the first available slot for PUSCH repetition and TBoMS transmission. This may also apply for the case when a single PUSCH transmission with counting based on available slots, i.e., K=1 for PUSCH repetition type A or N=1 and K=1 for TBoMS. This also applies for the case when K>1 for PUSCH repetition type A or N=1 and K>1 for TBoMS or N>1 and K>1 for TBoMS. Similarly, this may also apply for the case for OOO handling between PUSCH repetition type A and single slot PUSCH transmission, as well as between TBoMS and single-slot PUSCH transmission. In FIG. 5, slot #3 is the first available slot for first PUSCH repetition for TB #0. Based on this option, symbol in the slot #3 is used to determine whether OOO is applied between PUSCH repetition and single slot PUSCH.

Some embodiments are directed to a user equipment (UE) configured for operation in a fifth-generation new radio (5G NR) system. In these embodiments, the UE may decode a first downlink control information (DCI) and a second DCI received from a gNodeB (gNB). In these embodiments, the first DCI may schedule a first physical uplink shared channel (PUSCH) transmission with transport-block processing over multiple slots (TBoMS) and the second DCI may schedule a second PUSCH transmission with TBoMS. In these embodiments, the UE may check timing relations of the scheduled first and second PUSCH transmissions with TBoMS for validity. When the timing relations are valid, the UE may transmit the first PUSCH transmission in multiple slots in accordance with the first DCI and to transmit the second PUSCH transmission in multiple slots in accordance with the second DCI.

In some embodiments, the first PUSCH transmission with TBoMS may be associated with a first HARQ process ID for a scheduled cell and the second PUSCH transmission with TBoMS may be associated with a second HARQ process ID for the scheduled cell. In these embodiments, the first DCI may be received in a first physical downlink control channel (PDCCH) and the second DCI may be received in a second PDCCH. In these embodiments, when the first PDCCH ends at a first symbol (e.g., symbol i) and the UE is scheduled to start the first PUSCH transmission with TBoMS at a second symbol (e.g., symbol j), the second PUSCH transmission with TBoMS is not expected to be scheduled to start earlier than an end of the first PUSCH transmission with TBoMS when the second PDCCH that scheduled the second PUSCH transmission with TBoMS ends at a symbol later than the first symbol.

In these embodiments, for any two HARQ process IDs in a given scheduled cell, if the UE is scheduled to start a first TBoMS transmission starting in symbol j by a PDCCH ending in symbol i, the UE is not expected to be scheduled to transmit a TBoMS starting earlier than the end of the first TBoMS by a PDCCH that ends later than symbol i. In these embodiments, when the second DCI ends later than the end of the first DCI, the second PUSCH transmission with TBoMS is expected to begin after the end of the first PUSCH transmission with TBoMS. Examples of these embodiments are illustrated in FIG. 3 case C and case D.

In some embodiments, when the first PDCCH ends at a first symbol (e.g., symbol i) and the UE is scheduled to start the first PUSCH transmission with TBoMS at a second symbol (e.g., symbol j), and when the second PUSCH transmission with TBoMS is scheduled to start earlier than an end of the first PUSCH transmission with TBoMS when the second PDCCH that scheduled the second PUSCH transmission with TBoMS ends at a symbol later than the first symbol, the UE may identify both the first and second PUSCH transmissions with TBoMS as invalid scheduling for a TBoMS transmission (i.e., the timing relations are determined to be invalid), and refrain from transmitting the first and second PUSCH transmission in multiple slots.

In some embodiments, when both the first and second PDCCHs end at a same symbol, the UE may transmit the first PUSCH transmission in multiple slots in accordance with the first DCI and to transmit the second PUSCH transmission in multiple slots in accordance with the second DCI regardless of whether the second PUSCH transmission with TBoMS is scheduled to start earlier than an end of the first PUSCH transmission with TBoMS. An example of this is illustrated in FIG. 3 cases A and B.

In some embodiments, when the timing relations are determined to be invalid, the processing circuitry is configured to refrain from transmitting both the first PUSCH transmission with TBoMS in multiple slots in accordance with the first DCI and the second PUSCH transmission with TBoMS in multiple slots in accordance with the second DCI. In these embodiments, the first PUSCH transmission with TBoMS comprises at least a first transport block (TB0) for transmission in at least a first slot and in a second slot. In these embodiments, the second PUSCH transmission with TBoMS comprises at least a second transport block (TB1) for transmission in at least a third slot and in a fourth slot.

In some embodiments, the first PUSCH transmission with TBoMS may be associated with a first HARQ process ID for a scheduled cell and single-shot PUSCH transmission may be associated with a second HARQ process ID for the scheduled cell. In these embodiments, when the first PDCCH ends at a first symbol (e.g., symbol i) and the UE is scheduled to start the first PUSCH transmission with TBoMS at a second symbol (e.g., symbol j), single-slot PUSCH transmission is not expected to be scheduled to start earlier than an end of the first PUSCH transmission with TBoMS when a PDCCH that scheduled the single-slot PUSCH transmission ends at a symbol later than the first symbol. These embodiments are directed to out of order handling between TBoMS and single-slot PUSCH transmission. In these embodiments, for any two HARQ process IDs in a given scheduled cell, if the UE is scheduled to start a first TBoMS transmission starting in symbol j by a PDCCH ending in symbol i, the UE is not expected to be scheduled to transmit a PUSCH starting earlier than the end of the first TBoMS by a PDCCH that ends later than symbol i. Examples of these embodiments are illustrated in FIG. 4.

In some embodiments, when the UE is configured for physical uplink control channel (PUCCH) repetition with demodulation reference signal (DMRS) bundling, the UE may drop or cancel a PUCCH transmission of the PUCCH repetition overlapping with a physical uplink control channel (PUSCH) transmission when the PUCCH transmission that is overlapping has a lower priority than the PUSCH transmission. In some embodiments, when the UE is configured for PUCCH repetition, the UE may identify the cancelled PUCCH of the PUCCH repetition as an event which causes power consistency and phase continuity not to be maintained across PUCCH transmissions of the PUCCH repetition.

Some embodiments are directed to a user equipment (UE) configured for operation in a fifth-generation new radio (5G NR) system when the UE is configured for physical uplink control channel (PUCCH) repetition with demodulation reference signal (DMRS) bundling. In these embodiments, the UE may drop or cancel a PUCCH transmission of the PUCCH repetition overlapping with a physical uplink control channel (PUSCH) transmission when the PUCCH transmission that is overlapping has a lower priority than the PUSCH transmission. In these embodiments, the PUCCH transmission may be a low priority and the first and second PUCCH transmissions may be a high priority.

In some embodiments, the UE may perform channel estimation based on DMRSs that are bundled in multiple slots of the PUCCH repetition. In these embodiments, the UE may be configured to perform channel estimation based on DMRS that are bundled in multiple slots (i.e., across PUSCH repetitions). In these embodiments, the gNB may coherently combine estimated channels from multiple slots together for performance improvement. In these embodiments, the UE may maintain phase continuity and power consistency during a DMRS bundling window.

In some embodiments, when the UE is configured for PUCCH repetition, the UE may identify the cancelled PUCCH of the PUCCH repetition as an event which causes power consistency and phase continuity not to be maintained across PUCCH transmissions of the PUCCH repetition. In these embodiments, the PUCCH may either be scheduled (by DCI) or configured (by RAR UL grant).

In some embodiments, when the UE is configured for PUSCH repetition and when a PUSCH transmission of the PUSCH repetition is overlapping with a PUCCH transmission, the UE may cancel or drop the overlapping PUSCH transmission and identify the cancelled PUSCH repetition as an event which causes power consistency and phase continuity not to be maintained across PUSCH transmissions of the PUSCH repetition. In these embodiments, the UE may be configured for DMRS bunding in multiple slots for the PUSCH repetition.

In some embodiments, the PUSCH transmission may comprise PUSCH transmissions of PUSCH repetition type A scheduled by DCI format 0_1 or 0_2 or PUSCH repetition Type A with a configured grant, although the scope of the embodiments is not limited in this respect.

In some embodiments, the UE may be configured to decode a five-bit MCS information field of a DCI format 0_0 with CRC scrambled with TC-RNTI to determine a number of PUSCH repetitions for Msg3. In these embodiments, two bits of the five-bit MCS information field indicate the number of PUSCH repetitions for Msg3 and three bits of the five-bit MCS information field comprise an MCS indication although the scope of the embodiments is not limited in this respect. In some embodiments, the MCS indication may indicate an initial four MCS indices for Msg3 initial transmission and an additional four MCS indices for Msg3 retransmission.

In some of these embodiments, if the UE requests repetition of PUSCH scheduled by an RAR UL grant when transmitting a PUSCH scheduled by DCI format 0_0 with CRC scrambled by the TC-RNTI, the 3 LSBs of the MCS information field of the DCI format 0_0 with CRC scrambled by the TC-RNTI may provide a codepoint to determine the MCS index IMCS based on whether or not the higher layer parameter mcs-Msg3-Repetitions is configured. The UE may use the determined IMCS and a table to determine the modulation order (Qm) and Target code rate (R) used in the PUSCH transmission, although the scope of the embodiments is not limited in this respect.

Some embodiments are directed to a non-transitory computer-readable storage medium that stores instructions for execution by processing circuitry of a gNodeB (gNB). In these embodiments, the processing circuitry may be configured to encode a first downlink control information (DCI) and a second DCI for transmission to a user equipment (UE). In these embodiments, the first DCI may schedule a first physical uplink shared channel (PUSCH) transmission with transport-block processing over multiple slots (TBoMS) and the second DCI may schedule a second PUSCH transmission with TBoMS. In these embodiments, when the timing relations of the first and second PUSCH transmissions with TBoMS are valid, the processing circuitry may decode the first PUSCH transmission received in multiple slots from the UE in accordance with the first DCI and may decode the second PUSCH transmission received in multiple slots from the UE in accordance with the second DCI.

In some embodiments, the first PUSCH transmission with TBoMS may be associated with a first HARQ process ID for a scheduled cell and the second PUSCH transmission with TBoMS may be associated with a second HARQ process ID for the scheduled cell. In these embodiments, the first DCI may be encoded for transmission in a first physical downlink control channel (PDCCH) and the second DCI may be encoded for transmission in a second PDCCH. In these embodiments, when the first PDCCH ends at a first symbol (e.g., symbol i) and the UE is scheduled to start the first PUSCH transmission with TBoMS at a second symbol (e.g., symbol j), the second PUSCH transmission with TBoMS is not expected to be scheduled to start earlier than an end of the first PUSCH transmission with TBoMS when the second PDCCH that scheduled the second PUSCH transmission with TBoMS ends at a symbol later than the first symbol.

Figure 6:
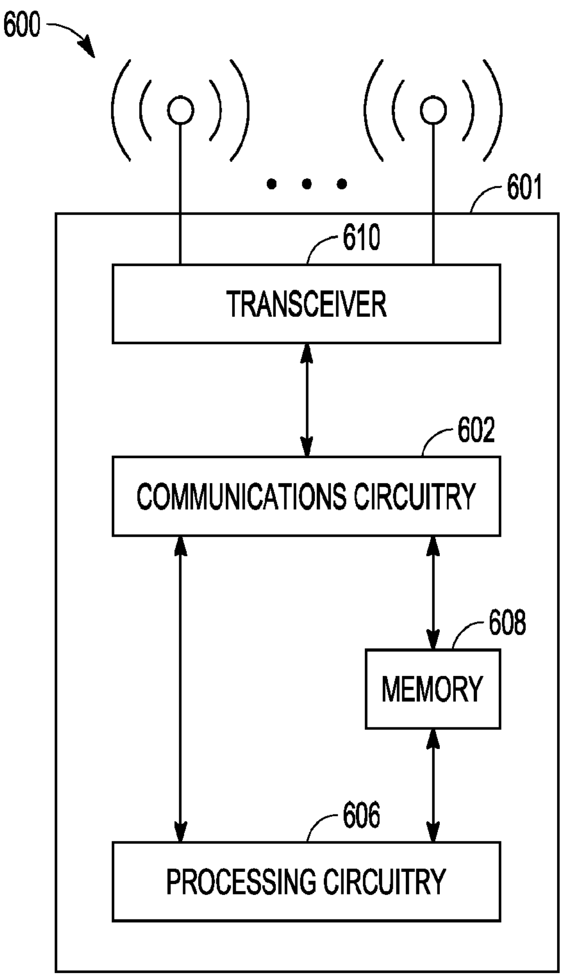
FIG. 6 illustrates a functional block diagram of a wireless communication device, in accordance with some embodiments.

FIG. 6 illustrates a functional block diagram of a wireless communication device, in accordance with some embodiments. Wireless communication device 600 may be suitable for use as a UE or gNB configured for operation in a 5G NR network. The communication device 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber device, an access point, an access terminal, or other personal communication system (PCS) device.

The communication device 600 may include communications circuitry 602 and a transceiver 610 for transmitting and receiving signals to and from other communication devices using one or more antennas 601. The communications circuitry 602 may include circuitry that can operate the physical layer (PHY) communications and/or medium access control (MAC) communications for controlling access to the wireless medium, and/or any other communications layers for transmitting and receiving signals. The communication device 600 may also include processing circuitry 606 and memory 608 arranged to perform the operations described herein. In some embodiments, the communications circuitry 602 and the processing circuitry 606 may be configured to perform operations detailed in the above figures, diagrams, and flows.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication device 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication device 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 600 may include one or more of a keyboard, a display, a non-volatile memory port, multiple antennas, a graphics processor, an application processor, speakers, and other mobile device elements. The display may be an LCD screen including a touch screen.

Although the communication device 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 600 may refer to one or more processes operating on one or more processing elements.

EXAMPLES

1. A system and method of wireless communication for a fifth generation (5G) or new radio (NR) system: determined, by UE, whether out of order condition is met for scheduling of transport block (TB) processing over multiple slots (TBoMS) and/or single-slot physical uplink shared channel (PUSCH).

2. The method of example 1, wherein for any two HARQ process IDs in a given scheduled cell, if the UE is scheduled to start a first TBoMS transmission starting in symbol j by a PDCCH ending in symbol i, the UE is not expected to be scheduled to transmit a TBoMS starting earlier than the end of the first TBoMS by a PDCCH that ends later than symbol i.

3. The method of example 1, wherein for any two HARQ process IDs in a given scheduled cell, if the UE is scheduled to start a first TBoMS transmission starting in symbol j by a PDCCH ending in symbol i, the UE is not expected to be scheduled to transmit a TBoMS starting earlier than the end of the first TBoMS by a PDCCH that ends not earlier than symbol i.

4. The method of example 1, wherein for any two HARQ process IDs in a given scheduled cell, if the UE is scheduled to start a first TBoMS transmission starting in symbol j and ending in symbol i by a first PDCCH, the UE is not expected to be scheduled to transmit a second TBoMS starting earlier than the end of the first TBoMS and later than the start of the first TBoMS by a second PDCCH.

5. The method of example 1, wherein UE is not expected to transmit a first TBoMS between the time duration of a second TBoMS.

6. The method of example 1, wherein for any two HARQ process IDs in a given scheduled cell, if the UE is scheduled to start a first TBoMS transmission starting in symbol j by a PDCCH ending in symbol i, the UE is not expected to be scheduled to transmit a PUSCH starting earlier than the end of the first TBoMS by a PDCCH that ends later than symbol i 7. The method of example 1, wherein for any two HARQ process IDs in a given scheduled cell, if the UE is scheduled to start a first TBoMS transmission starting in symbol j by a PDCCH ending in symbol i, the UE is not expected to be scheduled to transmit a PUSCH starting earlier than the end of the first TBoMS by a PDCCH that ends not earlier than symbol i.

8. The method of example 1, wherein for any two HARQ process IDs in a given scheduled cell, if the UE is scheduled to start a first TBoMS transmission starting in symbol j and ending in symbol i by a first PDCCH, the UE is not expected to be scheduled to transmit a single slot PUSCH starting earlier than the end of the first TBoMS and later than the start of the first TBoMS by a second PDCCH.

9. The method of example 1, wherein UE is not expected to transmit a PUSCH between the time duration of a TBoMS.

10. The method of example 1, wherein when PUCCH repetition with low priority is dropped when overlapping with PUSCH transmission with high priority, this should be treated as an event that violates power consistency and phase continuity 11. The method of example 1, wherein first 4 Modulation and coding scheme (MCS) indexes can be reused from these configured for Msg3 initial transmission, where 4 additional MCS indexes are configured for Msg3 retransmission.

12. The method of example 1, wherein for PUSCH repetition type A with counting based on available slot and TBoMS, the OOO handling is determined in accordance with the first PUSCH repetition or the first slot used for TBoMS transmission which is indicated by scheduling offset K2, regardless of whether the slot indicated by K2 is an available slot.

13. The method of example 1, wherein for PUSCH repetition type A with counting based on available slot and TBoMS, the OOO handling is determined in accordance with the first available slot for PUSCH repetition and TBoMS transmission.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a user equipment (UE) configured for operation in a fifth-generation new radio (5G NR) system, the apparatus comprising processing circuitry; and memory, the processing circuitry to:

request repetition of a physical uplink shared channel (PUSCH) scheduled by a random access response (RAR) uplink (UL) grant;

decode a downlink control information (DCI) format 0_0 with Cyclic Redundancy Check (CRC) scrambled by a Temporary Cell-Radio Network Temporary Identifier (TC-RNTI), the DCI format 0_0 including a 5-bit modulation coding scheme (MCS) information field;

wherein for a PUSCH scheduled by the DCI format 0_0:

determine a number of PUSCH repetitions based on two most significant bits (MSBs) of the 5-bit MCS information field of the DCI format; and determine a modulation order and target code rate for transmitting the PUSCH using three least significant bits (LSBs) of the 5-bit MCS information field of the DCI format, the three LSBs of the MCS information field of the DCI format provide a first codepoint for use in determining a first MCS index; and wherein for the PUSCH scheduled by the RAR UL grant, the processing circuitry is to determine the modulation order and target code rate using two LSBs of an MCS information field of the RAR UL grant, the two LSBs of the MCS information field of the RAR UL grant provide a second codepoint for use in determining a second MCS index, and transmit the PUSCH in accordance with the determined modulation order and target code rate and the number of repetitions.

2. The apparatus of claim 1, wherein the first MCS index is further determined based on whether a higher layer parameter mcs-Msg3-Repetions is configured, and wherein the second MCS index is further determined based on whether the higher layer parameter mcs-Msg3-Repetions is configured.

3. The apparatus of claim 1, wherein when the UE is configured for physical uplink control channel (PUCCH) repetition with demodulation reference signal (DMRS) bundling, the processing circuitry is to:

cancel a PUCCH transmission of the PUCCH repetition overlapping with a PUSCH transmission when the PUCCH transmission has a lower priority than the PUSCH transmission.

4. The apparatus of claim 3, wherein when the UE is configured for the PUCCH repetition with DMRS bundling, the processing circuitry is to identify cancellation of the PUCCH transmission as an event which causes power consistency and phase continuity not to be maintained across PUCCH transmissions of the PUCCH repetition within a nominal time domain window (TDW).

5. The apparatus of claim 4, wherein when the UE is configured for the PUCCH repetition with DMRS bundling, the processing circuitry is to determine a channel estimate based on DMRSs for the PUCCH transmissions of the PUCCH repetition within a same time domain window (TDW).

6. The apparatus of claim 4, wherein when DMRS bundling is applied to transport-block processing over multiple slots (TBoMS), the processing circuitry is to determine a channel estimate based on DMRSs for the PUCCH transmissions of the PUCCH repetition within a same time domain window (TDW).

7. The apparatus of claim 4, wherein the processing circuitry is further to decode a first DCI and a second DCI received from a gNodeB (gNB), the first DCI scheduling a first PUSCH transmission with transport-block processing over multiple slots (TBoMS), the second DCI scheduling a second PUSCH transmission with TBoMS;

check timing relations of the first and second PUSCH transmissions with TBoMS for validity; and when the timing relations are valid, configure the UE to transmit the first PUSCH transmission in multiple slots in accordance with the first DCI and to transmit the second PUSCH transmission in multiple slots in accordance with the second DCI.

8. The apparatus of claim 7, wherein the first PUSCH transmission with TBoMS is associated with a first HARQ process ID for a scheduled cell and the second PUSCH transmission with TBoMS is associated with a second HARQ process ID for the scheduled cell, wherein the first DCI is received in a first physical downlink control channel (PDCCH) and the second DCI is received in a second PDCCH, wherein when the first PDCCH ends at a first symbol and the UE is scheduled to start the first PUSCH transmission with TBoMS at a second symbol, the second PUSCH transmission with TBoMS is not expected to be scheduled to start earlier than an end of the first PUSCH transmission with TBoMS when the second PDCCH that scheduled the second PUSCH transmission with TBoMS ends at a symbol later than the first symbol.

9. A non-transitory computer-readable storage medium that stores instructions for execution by processing circuitry of a user equipment (UE) configured for operation in a fifth-generation new radio (5G NR) system, the processing circuitry to:

request repetition of a physical uplink shared channel (PUSCH) scheduled by a random access response (RAR) uplink (UL) grant;

decode a downlink control information (DCI) format 0_0 with Cyclic Redundancy Check (CRC) scrambled by a Temporary Cell-Radio Network Temporary Identifier (TC-RNTI), the DCI format 0_0 including a 5-bit modulation coding scheme (MCS) information field;

wherein for a PUSCH scheduled by the DCI format 0_0:

determine a number of PUSCH repetitions based on two most significant bits (MSBs) of the 5-bit MCS information field; and determine a modulation order and target code rate for transmitting the PUSCH using three least significant bits (LSBs) of the 5-bit MCS information field, wherein the three LSBs of the MCS information field provide a codepoint for use in determining an MCS index based on whether or not a higher layer parameter mcs-Msg3-Repetions is configured; and transmit the PUSCH in accordance with the determined modulation order and target code rate and the number of repetitions, wherein for a PUSCH scheduled by the RAR UL grant, the processing circuitry is to determine the modulation order and target code rate using two LSBs of the MCS information field based on whether or not the higher layer parameter mcs-Msg3-Repetions is configured, wherein when the UE is configured for physical uplink control channel (PUCCH) repetition with demodulation reference signal (DMRS) bundling, the processing circuitry is to:

cancel a PUCCH transmission of the PUCCH repetition overlapping with a PUSCH transmission when the PUCCH transmission has a lower priority than the PUSCH transmission, and wherein when the UE is configured for the PUCCH repetition with DMRS bundling, the processing circuitry is to identify cancellation of the PUCCH transmission as an event which causes power consistency and phase continuity not to be maintained across PUCCH transmissions of the PUCCH repetition within a nominal time domain window (TDW).

10. The non-transitory computer-readable storage medium of claim 9, wherein when the UE is configured for the PUCCH repetition with DMRS bundling, the processing circuitry is to determine a channel estimate based on DMRSs for the PUCCH transmissions of the PUCCH repetition within a same time domain window (TDW).

11. The non-transitory computer-readable storage medium of claim 10, wherein when DMRS bundling is applied to transport-block processing over multiple slots (TBoMS), the processing circuitry is to determine a channel estimate based on DMRSs for the PUCCH transmissions of the PUCCH repetition within a same time domain window (TDW).

12. The non-transitory computer-readable storage medium of claim 11, wherein the processing circuitry is further to decode a first DCI and a second DCI received from a gNodeB (gNB), the first DCI scheduling a first PUSCH transmission with transport-block processing over multiple slots (TBoMS), the second DCI scheduling a second PUSCH transmission with TBoMS;

check timing relations of the first and second PUSCH transmissions with TBoMS for validity; and when the timing relations are valid, configure the UE to transmit the first PUSCH transmission in multiple slots in accordance with the first DCI and to transmit the second PUSCH transmission in multiple slots in accordance with the second DCI.

13. The non-transitory computer-readable storage medium of claim 12, wherein the first PUSCH transmission with TBoMS is associated with a first HARQ process ID for a scheduled cell and the second PUSCH transmission with TBoMS is associated with a second HARQ process ID for the scheduled cell, wherein the first DCI is received in a first physical downlink control channel (PDCCH) and the second DCI is received in a second PDCCH, wherein when the first PDCCH ends at a first symbol and the UE is scheduled to start the first PUSCH transmission with TBoMS at a second symbol, the second PUSCH transmission with TBoMS is not expected to be scheduled to start earlier than an end of the first PUSCH transmission with TBoMS when the second PDCCH that scheduled the second PUSCH transmission with TBoMS ends at a symbol later than the first symbol.

14. An apparatus for a gNodeB (gNB) configured for operation in a fifth-generation new radio (5G NR) system, the apparatus comprising processing circuitry; and memory, the processing circuitry to:

process a request for repetition of a physical uplink shared channel (PUSCH) scheduled by a random access response (RAR) uplink (UL) grant, the request received from a user equipment (UE);

encode a downlink control information (DCI) format 0_0 with Cyclic Redundancy Check (CRC) scrambled by a Temporary Cell-Radio Network Temporary Identifier (TC-RNTI) for transmission to the UE, the DCI format 0_0 including a 5-bit modulation coding scheme (MCS) information field;

wherein for a PUSCH scheduled by the DCI format 0_0:

determine a number of PUSCH repetitions based on two most significant bits (MSBs) of the 5-bit MCS information field of the DCI format; and determine a modulation order and target code rate for transmitting the PUSCH using three least significant bits (LSBs) of the 5-bit MCS information field of the DCI format, the three LSBs of the MCS information field of the DCI format provide a first codepoint for use in determining a first MCS index; and wherein for the PUSCH scheduled by the RAR UL grant, the processing circuitry is to determine the modulation order and target code rate using two LSBs of an MCS information field of the RAR UL grant, the two LSBs of the MCS information field of the RAR UL grant provide a second codepoint for use in determining a second MCS index, and receive the PUSCH in accordance with the determined modulation order and target code rate and the number of repetitions.

15. The apparatus of claim 14, wherein the first MCS index is further determined based on whether a higher layer parameter mcs-Msg3-Repetions is configured, and wherein the second MCS index is further determined based on whether the higher layer parameter mcs-Msg3-Repetions is configured.

16. The apparatus of claim 15, wherein the processing circuitry is further to encode a first DCI and a second DCI for transmission to the UE, the first DCI scheduling a first PUSCH transmission with transport-block processing over multiple slots (TBoMS), the second DCI scheduling a second PUSCH transmission with TBoMS.

17. The apparatus of claim 16, wherein the first PUSCH transmission with TBoMS is associated with a first HARQ process ID for a scheduled cell and the second PUSCH transmission with TBoMS is associated with a second HARQ process ID for the scheduled cell, and wherein the first DCI is received in a first physical downlink control channel (PDCCH) and the second DCI is received in a second PDCCH.

* * * * *